United States Patent [19]

Bouteille et al.

[11] Patent Number: 4,953,404

[45] Date of Patent: Sep. 4, 1990

[54] MECHANISM FOR AN ANEROID BAROMETER

[75] Inventors: Christian Bouteille; Pascal Blaise; Gabriel Bosson; Emile Mesnier, all of Morteau; Pierre Vuillemin, Villiers le Lac, all of France

[73] Assignee: Altitude S.A., De Gauele, France

[21] Appl. No.: 365,419

[22] Filed: Jun. 13, 1989

[30] Foreign Application Priority Data

Jun. 17, 1988 [FR] France .................... 88 08407

[51] Int. Cl.⁵ .............................. G01L 7/12
[52] U.S. Cl. .......................... 73/387; 73/386; 73/729
[58] Field of Search ............. 73/387, 386, 384, 729

[56] References Cited

U.S. PATENT DOCUMENTS

| | | | |
|---|---|---|---|
| 3,451,272 | 6/1969 | Frey et al. | 73/387 |
| 3,631,723 | 1/1972 | Eberhard et al. | 73/387 |
| 3,874,242 | 4/1975 | Csaposs et al. | 73/386 |
| 4,006,638 | 2/1977 | Woelfl | 73/387 |
| 4,238,958 | 12/1980 | Dostmann | 73/386 |
| 4,255,970 | 3/1981 | Van Pottelberg | 73/386 |
| 4,361,048 | 11/1982 | Hüttinger | 73/386 |
| 4,543,824 | 10/1985 | Marterer | 73/386 |

FOREIGN PATENT DOCUMENTS 0126273 4/1987 European Pat. Off. .

Primary Examiner—Joseph A. Orsino
Assistant Examiner—Brent A. Swarthout
Attorney, Agent, or Firm—Kane, Dalsimer, Sullivan, Kurucz, Levy, Eisele and Richard

[57] ABSTRACT

Mechanism for an aneroid barometer comprising, in a support 2, a primary lever 4 whose center is in contact with the cell 3, the axis of rotation 40 of this primary lever being located at the periphery of the support, an endless screw 5 equipped with a helicoidal ramp 51 made integral with the lever 4 via a bridge 7, a secondary lever 6 whose axis of rotation 60 rests on the free end 41 of the lever 4, the free end 61 of this lever 6 ending in a point 62 which acts permanently on the helicoidal ramp 51. A single spring 8 bears on the support 2 and keeps both the lever 4 in contact with the cell and the secondary lever on the primary lever.

4 Claims, 2 Drawing Sheets

MECHANISM FOR AN ANEROID BAROMETER

FIELD OF THE INVENTION

The invention relates to a mechanism for an aneroid barometer comprising a support, an aneroid cell, a spindle carrying an indicator needle and means for converting the linear movements of deformation of the cell into angular rotational movements of the indicator needle.

PRIOR ART

The document EP 0 126 273 describes a mechanism for a barometer defined in that an element of helicoidal form is permanently mounted, in that the outlet shaft may not only rotate but may also be displaced in an axial direction, and in that the end of the outlet shaft which is turned towards the membrane capsule bears on said membrane capsule and is held in this position by the return spring.

The linear movements of deformation of the cell are of very small amplitude, of the order of two tenths of a mm.

The object of the invention consists in producing a mechanism capable of amplifying the movements of deformation of the cell and of thereby increasing the reading range of the barometer.

SUMMARY OF THE INVENTION

To this end, the mechanism for a barometer according to the invention comprises, placed in a support for combined action, a primary lever whose center is in contact with the center of the cell, which exerts, at this point of the lever, a driving force Fm, the axis of rotation of this primary lever being located at the periphery of the support and held in place by a bearing spring, the cell being fixed onto the support by means of a screw which is concentric with a geometrical axis XX passing through the center of the primary lever;

an endless screw equipped with a helicoidal ramp concentric with the axis XX, held by a point in the center of the primary lever with which this screw is thereby made integral, rotating freely and beneath, unlike the cell, the indicator needle of the barometer;

a secondary lever whose axis of rotation rests on the free end of the primary lever which exerts a driving force Fm' on the secondary lever which force is transmitted to the endless screw via a point formed by the free end of said secondary lever, this point being permanently in the helicoidal ramp of the endless screw; and a single spring bearing on the support in order to exert a resisting force R on the secondary lever which transmits this force to the primary lever.

This mechanism has the advantage of amplifying the movements of the aneroid cell transmitted to an indicator needle fixed on the endless screw.

BRIEF DESCRIPTION OF THE DRAWINGS

Other advantages will emerge from the description, made by way of nonlimiting example, of a preferred embodiment and of the drawing in which.

DESCRIPTION OF THE PREFERRED EMBODIMENT

Figure 1:
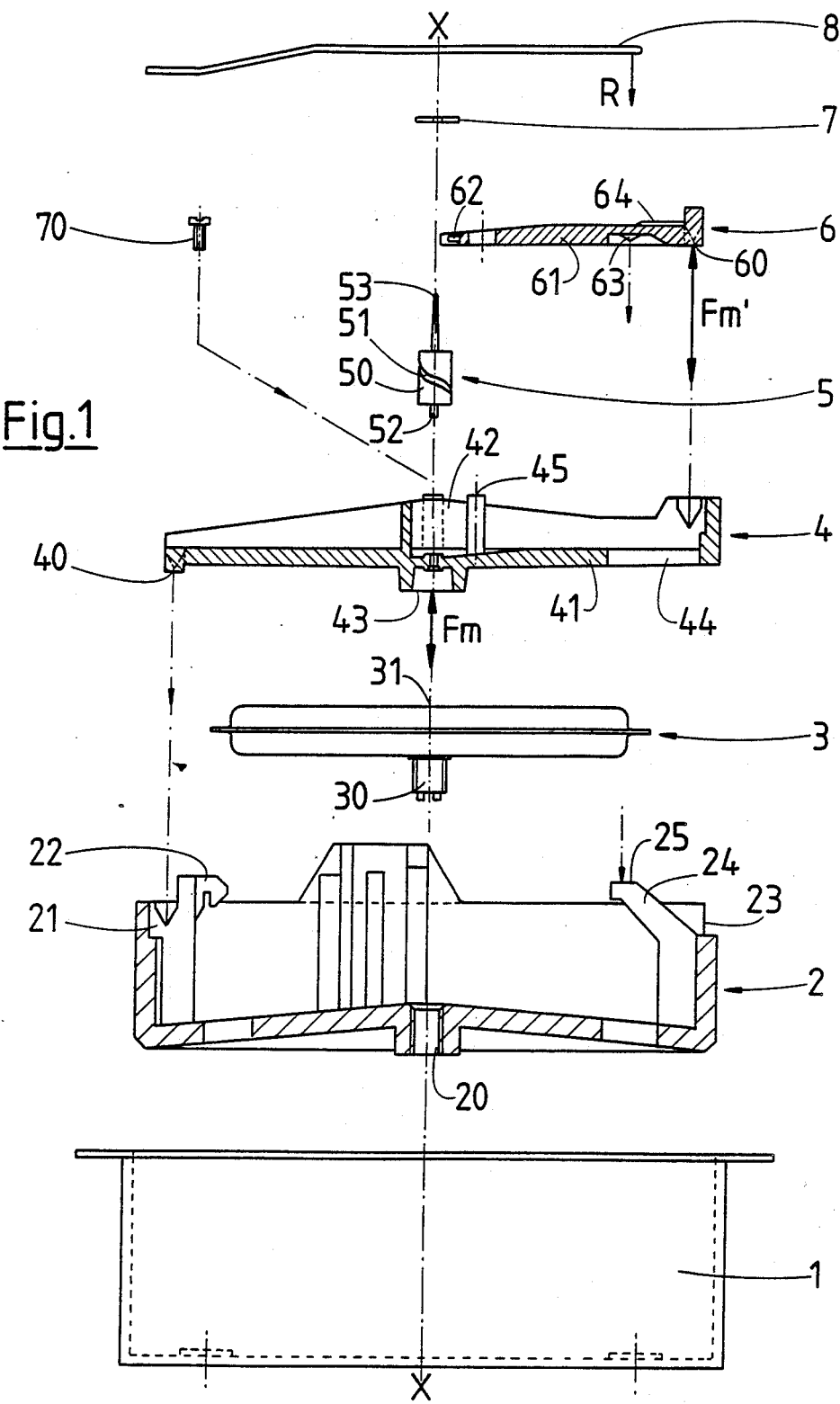
FIG. 1 is an exploded sectional view of the mechanism for converting the alternating linear movements of the cell into angular rotational movements.

The mechanism for the barometer is placed in a casing 1 which is closed by a dial. It consists of a support 2 with two complementary levers, a primary lever 4 and a secondary lever 6 which interact in order to transmit the deformations of a circular aneroid cell 3, which is fixed by means of a screw 30 to the center 20 of the support 2, to an endless screw 5 carrying an indicator needle.

The screw 30 makes it possible to adjust the barometer as a function of the altitude of its static location.

Figure 2:
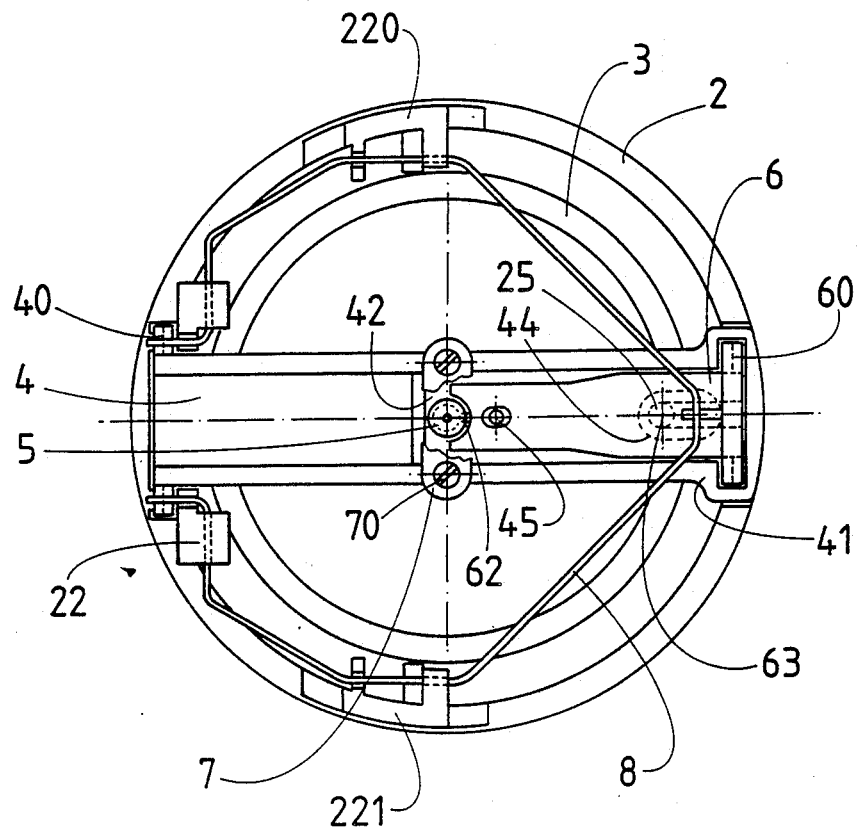
FIG. 2 is a plan view of the mechanism with the bearing spring.

The support 2 is circular and comprises in particular:

a threaded orifice 20 for the screw 30 of the cell 3, a housing 21 receiving the axis of rotation 40 of the primary lever 4, projections 22 acting as a support, on either side of the primary lever, for the branches of a spring 8 (FIG. 2) which, after passing through baffles 220, 221 hold the axis of rotation of the lever in its housing, a notch 23, diametrically opposed to the housing 21, which guides the oscillations of the primary lever 4, a guide 24, fixed on the base of the support 2 and perpendicular to its base, passes through an oblong opening 44 in the free arm 41 of the primary lever 4, the upper part 25 of this guide 24 emerging through the oblong opening 44 acts as a support point 63 for the secondary lever 6.

The primary lever 4 comprises two identical arms, on either side of its support point 43 on the center 31 of the cell 3, one of which is fixed by the spring 8 in the housing 21 comprising at its end the axis of rotation 40, the other receiving on its free end 41 the axis of rotation 60 of the secondary lever 6, and the point of contact 31/43 between the cell and the primary lever is the point of application of a driving force Fm created by the variations in volume of the cell 3 through the effect of variations in atmospheric pressure.

This force Fm is exerted along a geometric axis XX perpendicular to the plane of symmetry of the cell 3 and causes the primary lever 4 to pivot about its axis of rotation 40.

The primary lever 4 comprises, opposite the point of contact 43 and concentric with the axis XX, a cage 42 receiving an endless screw 5.

A peg 45 is fixed on the primary lever 4 between the cage 42 and the free end 41 in order to guide the free arm 61 of the secondary lever 6.

The endless screw 5, located in the cage 42, is integrally attached to the primary lever 4 by means of a bridge 7 fixed by two screws 70, which prevents any axial displacement thereof whilst leaving it free to rotate in an angular direction. The screw 5 comprises three parts concentric with the same axis XX perpendicular to the superimposed planes of the support 2, of the cell 3 and of the primary lever 4: a cylinder 50 provided with a helicoidal ramp 51 rotating on a pivot 52 and extended opposite the pivot by a spindle 53 carrying the indicator needle.

A secondary lever 6 bears via its axis of rotation 60 on the free end 41 of the primary lever 4. The rocking point 63 of the lever 6 bears, through the oblong opening 44, on the upper part 25 of the guide 24.

The arm 61 of the lever 6 comprises a free end in the form of a point 62. This point 62 penetrates into the helicoidal ramp 51 of the endless screw 5. The movements of the lever 6 cause the angular rotation of the endless screw 5 through the action of the point 62 on the helicoidal ramp 51.

A spring 8 exerts a return force R which holds the primary lever 4 in permanent contact with the cell 3. On the one hand, it bears on the support 2 at the level of the axis of rotation 40 of the lever 4 which it holds in its housing 21 while passing via the projections 22 and over the baffles 220, 221 located on either side of the housing 21 at the periphery of the support 2 and, on the other hand, on the secondary lever 6 at a point 64 located between the axis of rotation 60 and the rocking point 63.

Briefly, this mechanism for a barometer is composed of five elements interacting together: a support 2, a primary lever 4, an endless screw 5 equipped with a helicoidal ramp 51, a secondary lever 6 whose free end is a point 62 and a bearing spring 8.

We claim:

1. A apparatus that is an aneroid barometer comprising a support which houses means for detecting barometric changes, said means comprised of an aneroid cell fixed to the support, a primary lever in contact with the cell, the lever being fixably mounted at one end to the support, said end comprising the axis of rotation of the lever, the lever carrying an endless screw integrally attached to the primary lever, said endless screw having means for receiving an end of a secondary lever and said screw having a spindle which carries an indicator needle, a secondary lever contacting the upper end of the primary lever, said secondary lever possessing means for rotating the endless screw, a spring which bears upon the support and the secondary lever and exerting a resisting force upon the secondary lever which transmits it to the primary lever, the combined action of the aneroid cell, primary lever, secondary lever, endless screw, means for receiving an end of the secondary lever, and spring comprising means for converting the deformation of the aneroid cell into angular rotational movement of the indicator needle, said movement being measured by means of a dial, wherein the center (43) of the primary lever (4) is held in contact with the center (31) of the cell (3) by a spring (8), the axis of rotation (40) of this lever being located in a housing (21) at the periphery of the support (2), the free end (41) of the primary lever supporting the axis of rotation (60) of the secondary lever (6) at the level of a notch (23) of the support.

2. The mechanism for a barometer as claimed in claim 1, wherein the endless screw (5) is placed in a cage (42) in the center of the primary lever (4) and is integrally attached to the primary lever by means of a bridge (7) fixed by screws (70), wherein it comprises a cylinder having a helicoidal ramp, said cylinder being attached to a spindle, the cylinder, ramp and spindle being concentric with the same axis XX perpendicular to the superimposed planes of the support (2), of the cell (3) and of the primary lever, and the spindle (53) carrying the indicator needle.

3. The mechanism for a barometer as claimed in claim 2, wherein the secondary lever (6) comprises a rocking point (63) bearing on the upper end (25) of a guide (24) perpendicular to a base of the support (2) and wherein this guide passes through the primary lever (4) via an oblong opening (44).

4. The mechanism for a barometer as claimed in claim 3, wherein the secondary lever (6) has a free end which is a point (62), wherein this point penetrates into the helicoidal ramp (51) and wherein the movements of the lever (6) cause the angular rotation of the endless screw (5).

* * * * *